United States Patent [19]

Kikuchi

[11] Patent Number: 4,981,538

[45] Date of Patent: Jan. 1, 1991

[54] PROCESS FOR PRODUCING INFORMATION RECORDING MEDIUM

[75] Inventor: Yasushi Kikuchi, Kanagawa, Japan

[73] Assignee: Fuji Photo Film Co., Ltd., Minami-ashigari, Japan

[21] Appl. No.: 380,330

[22] Filed: Jul. 17, 1989

[30] Foreign Application Priority Data

Jul. 18, 1988 [JP] Japan .................. 63-178366

[51] Int. Cl.⁵ .................. B29C 65/00; B29C 65/08
[52] U.S. Cl. .................. 156/73.1; 156/308.2; 156/580.1; 346/137; 360/135
[58] Field of Search .......... 156/73.1, 308.2, 309.6, 156/580.1, 580.2; 346/137, 135.1; 360/135

[56] References Cited

U.S. PATENT DOCUMENTS

| | | | |
|---|---|---|---|
| 4,549,922 | 10/1985 | Oishi et al. .......... | 360/135 |
| 4,698,715 | 10/1987 | Oishi .................. | 360/135 |
| 4,785,444 | 11/1988 | Nakane et al. ....... | 360/135 |
| 4,834,819 | 5/1989 | Todo et al. .......... | 156/580.2 |
| 4,836,890 | 6/1989 | Murata et al. ....... | 156/73.1 |
| 4,877,667 | 10/1989 | Hattori et al. ....... | 428/212 |

Primary Examiner—Michael G. Wityshyn
Attorney, Agent, or Firm—Sixbey, Friedman, Leedom & Ferguson

[57] ABSTRACT

Disclosed is a process for producing an information recording medium of air-sandwich type for optically recording or reproducing information which comprises an information recording disc and hubs provided on both sides at the center thereof. In the process, using a receiving tool provided with a disc-shaped raised portion for receiving a substrate at its center and a hub-receiving center axis extended upward from the center, a circular hole of the disc is fitted to the raised portion of the receiving tool, then a magnetizable hub having a magnetizable substance and a clamping hole at the center is fitted coaxially to the recording disc, and the hub is joined to the disc. Thereafter, the disc joined with the hub is turned over and fitted onto other receiving tool, and the other hub is joined to the disc. Otherwise, after one hub is joined to the recording disc on one side, another magnetizable hub may be joined to the back side of the recording disc by fitting the magnetizable hub to a different receiving tool and then fitting the above-obtained disc onto the magnetizable hub.

8 Claims, 2 Drawing Sheets

PROCESS FOR PRODUCING INFORMATION RECORDING MEDIUM

FIELD OF THE INVENTION

The present invention relates to a process for producing an information recording medium for optically recording or reproducing information which is joined on both sides with hubs having a magnetizable substance.

BACKGROUND OF THE INVENTION

An information recording medium for recording and reading information using high energy density beam such as a laser beam has been developed in recent years and is now put into practical use. The information recording medium is called "optical disc" and can be used as a video disc, audio disc and disc memory for large-capacity static image files and large-capacity computers.

The optical disc basically comprises a disc-shaped transparent substrate of a plastic material or glass and a recording layer provided thereon. An undercoat layer or intermediate layer made of a polymer material can be provided on the surface (on which the recording layer is provided) of the substrate for improving smoothness of the surface, adhesion between the substrate and the recording layer and the light sensitivity of the optical disc.

Writing of information on the optical disc or reading of information from the recording disc is conducted in an information recording or reproducing apparatus by irradiating the recording layer of the disc with a laser beam while rotating the disc on its plane. For the rotation of the optical disc, the disc is mounted onto a rotatable spindle of the apparatus. For facilitating the fitting of an optical disc to the spindle, a separately prepared hub can be provided to the disc. Further, it has been proposed that the hub is made magnetizable so as to more firmly fix the optical disc onto a rotating element of the recording or reproducing apparatus. The magnetizable hub is provided with magnetizable (magnetic) substance such as a magnetizable metal plate. Such hub is firmly fitted onto a rotating magnet element of a recording or reproducing apparatus, and therefore a recording medium having such magnetizable hub is firmly mounted onto the rotating element.

The hub has a center hole for insertion of a spindle of the rotating element, and is generally constituted of only a body (disc shaped part) or a body and a flange. The hub is arranged within the information recording disc and joined thereto in such a manner that the hub is made concentric to the center of the disc.

Heretofore, joining of the hub to the information recording disc is conducted by the steps of fixing the disc to a rotatable X-Y table, determining the center of the groove formed on the information recording disc by observing the groove through a microscope while rotating the X-Y table, adjusting the X-Y table in such a manner that the center of the groove, which is the center of the information recording disc, coincides with the center of a rotating shaft of the X-Y table, and finally setting the hub to the center of the rotating shaft of the information recording disc to join the hub to the information recording disc. In the case of an information recording medium of air-sandwich type, the same process is done on the other surface (back surface). That is, the center of the information recording disc is determined on its back surface as described above, then the X-Y table is adjusted in such a manner that the center of the disc coincides with the center of a rotating shaft of the X-Y table, and finally a hub is joined to the information recording disc.

Adhesion or ultrasonic welding or the like can be used for the joining.

Thus, an information recording medium provided with a magnetizable hub has been required to adjust the joining location of the hub as described above. There have been known two different types of hubs; one has a boss having smaller diameter (smaller outer diameter) than that of the circular hole of the information recording disc so as to enable the desired adjustment of the location on joining, and the other has no boss. Therefore, there likely arises eccentricity (locational deviation of the center of the information recording disc and the center of the hole for insertion of a spindle) during the joining procedure of the hub to the information recording disc.

In regard of an optical disc having a diameter of 130 mm (5.25 inches), there has been a standard defined by ISO (International Organization for Standardization) with respect to the form and the characteristics of an optical disc employing a magnetizable hub. According to the ISO Standard, it is required that the above-described eccentricity is kept within 25 $\mu$m.

In the conventional process for producing an information recording disc, the steps for determining the center of the disc and joining the hub to the center are made manually for the most part, and the accuracy of the joining depends greatly on the worker's skills. Moreover, it takes several minutes to assemble each disc, which gives poor productivity. For this reason, several attempts have been made to conduct a series of the centering processes (which is made to determine the center of the information recording disc) automatically by machine. However, the centering process using a known machine requires a complicated treatment system as well as high manufacturing cost. Moreover, the employment of a known machine for the centering does not give satisfactory increase of productivity.

SUMMARY OF INVENTION

It is an object of the present invention to provide a process for producing an information recording medium of air-sandwich type provided with hubs on both sides wherein the information recording medium having high dimensional accuracy can be produced with increased productivity.

There is provided by the present invention a process for producing an information recording medium which comprises the steps of:

fitting an information recording disc which has a circular hole at its center and comprises two disc-shaped resin substrates joined together a pregroove provided on each of the substrates and a recording layer provided on at least one of the substrates, any recording layer being positioned inward, onto a receiving tool provided with a disc-shaped raised portion for receiving an information recording disc at its center and a hub-receiving center axis for receiving a hub (hub-receiving center axis) extended upward from the center of the raised portion in such a manner that the circular hole of the information recording disc and the raised portion of the receiving tool are made concentric, then fitting a magnetizable hub having a magnetizable substance and a clamping hole at its center to the information recording disc in such a manner that the clamping hole and the hub-receiving center axis of the receiving tool are made coaxial, and joining the magnetizable hub to the information recording disc; and turning over the information recording disc joined with the magnetizable hub to position upward a resin substrate-side of the information recording disc where the magnetizable hub is not joined, fitting the information recording disc onto a different receiving tool having a hub-receiving center axis in such a manner that the hub-receiving center axis and the clamping hole of the magnetizable hub are made coaxial, then fitting another magnetizable hub having a clamping hole to the information recording disc in such a manner that the clamping hole and the hub-receiving center axis are made coaxial, and joining the magnetizable hub to the information recording disc.

The present invention further provides a process for producing an information recording medium which comprises the steps of:

fitting an information recording disc which has a circular hole at its center and comprises two disc-shaped resin substrates joined together, a pregroove provided on each of the substrates and a recording layer provided on at least one of the substrates, a respective recording layer being positioned inward, onto a receiving tool provided with a disc-shaped raised portion for receiving a substrate at the center of the tool and a center axis for receiving a hub (hub-receiving center axis) extended upward from the center of the raised portion in such a manner that the circular hole of the information recording disc and the raised portion of the receiving tool are made concentric, then fitting a magnetizable hub having a magnetizable substance and a clamping hole at its center to the information recording disc in such a manner that the clamping hole and the hub-receiving center axis of the receiving tool are made coaxial, and joining the magnetizable hub to the information recording disc;

fitting another magnetizable hub having a clamping hole onto a different receiving tool provided with a hub-receiving center axis in such a manner that the clamping hole and the hub-receiving center axis are made coaxial; and fitting the information recording disc joined with the magnetizable hub, said magnetizable hub being positioned upward, onto the magnetizable hub on the receiving tool in such a manner that the different clamping hole of the magnetizable hub having been joined with the information recording disc and the hub-receiving center axis of the different receiving tool are made coaxial, and joining the magnetizable hub on the different receiving tool to the information recording disc.

In the process for producing an information recording medium of the present invention, there is no need of conducting the conventional centering procedure in joining the hub to the information recording disc. Accordingly, an information recording medium can be produced easily and for a short period of time, so that the process of the invention is very suitable for mass production.

In other words, an information recording medium of air-sandwich type which is almost free from eccentricity can be produced only by fitting substrates and hubs having less eccentricity to the precisely prepared receiving tool in order.

Further, the information recording medium produced by the process of the invention shows excellent dimensional accuracy and high stability.

DETAILED DESCRIPTION OF THE INVENTION

The representative embodiment example of the process for producing an information recording medium according to the invention is described in detail referring to the attached drawings.

Figure 1:
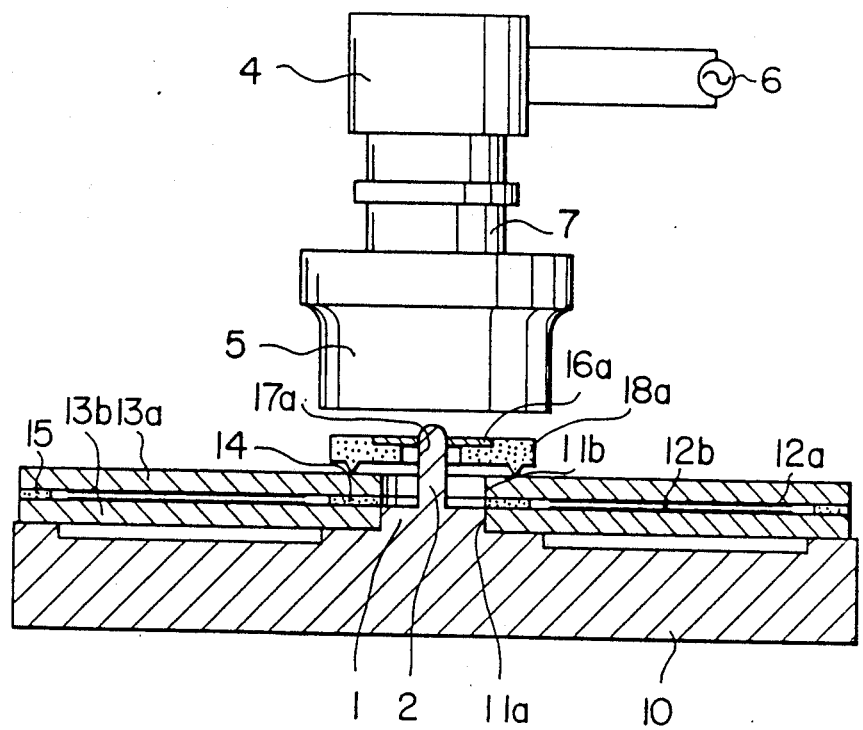
FIGS. 1, 2 and 3 are views illustrating joining of magnetizable hubs to an information recording disc in the process for producing an information recording medium according to the present invention.

FIG. 1 is a sectional view illustrating an example of welding-joining methods in which a magnetizable hub 18a having a magnetizable (magnetic) substance 16a and a clamping hole 17a is welded using a ultrasonic welding machine 4 to one resin substrate 13a of two disc-shaped resin substrates 13a, 13b provided with a pregroove and joined together through an inner-side ring-shaped spacer 14 and an outer-side ring-shaped spacer 15.

In detail, a receiving tool 10 having a disc-shaped raised portion 1 for receiving a substrate at its center and a hub-receiving center axis 2 extended upward from the center as shown in FIG. 1 is first prepared. To the raised portion 1 of the receiving tool 10 is fitted an optical disc comprising two disc-shaped resin substrates 13a, 13b joined together through an inner-side ring-shaped spacer 14 and an outer-side ring-shaped spacer 15 in such a manner that the resin substrate 13a is positioned upward and a circular hole 11a of the optical disc and the raised portion 1 are made concentric.

Then, onto the resin substrate 13a is fitted a magnetizable hub 18a having a magnetizable substance 16a and a clamping hole 17a in such a manner that the center of the clamping hole 17a and the hub-receiving center axis 2 are made coaxial.

Subsequently, the magnetizable hub 18a is welded to the center of the resin substrate 13a by the use of ultrasonic welding machine 4. The ultrasonic welding machine 4 is equipped with an applying horn 5 for application of ultrasonic wave. Ultrasonic wave is generated from an ultrasonic generator 6 and transmitted to the applying horn 5 through a converter 7. The joining of the hub 18a to the resin substrate 13a is carried out first by descending the applying horn 5 of the ultrasonic welding machine 4 to press the hub 18a.

In the invention, the location of the hub is determined on the basis of the circular holes 11a, 11b of the disc-shaped resin substrates 13a, 13b through the receiving tool 10. For accomplishing such determination of the hub location, it is required that the circular hole of the resin substrate is formed accurately at the center of the substrate to hardly give eccentricity between the circular hole of the resin substrate and the pregroove on the surface of the substrate (that is, the circular hole and the pregroove are made concentric), while in the conventional process the circular hole is formed at almost the center of the substrate. Such substrate can be obtained by molding a resin for a substrate in the conditions of giving have its circular hole more strictly and more precisely than the convention one. The eccentricity between the circular hole of each disc-shaped resin substrate and the pregroove on the surface of the substrate is preferably not more than 10 μm, more preferably not more than 7 μm. As a matter of course, the eccentricity of the raised portion for receiving the resin substrate and the periphery portion of the hub-receiving center axis provided on the receiving tool is required to be made as small as possible, and the eccentricity thereof is preferably kept at not more than 2 μm.

The information recording disc (optical disc) used in the invention can be prepared by providing a recording layer on at least one substrate of the above-mentioned two disc-shaped resin substrates having a circular hole and then joining the two substrates together through an inner-side ring-shaped spacer and an outer-side ring-shaped spacer in such a manner that the recording layer(s) is positioned inward. The eccentricity (locational deviation) between the two resin substrates is preferably not more than 5 μm, more preferably not more than 3 μm.

The information recording disc prepared (molded) with high accuracy as above is fitted to the raised portion of the receiving tool which has been also prepared with high accuracy under the coaxial condition, whereby the magnetizable hub can be joined to the information recording disc with prominently reduced eccentricity. For such joining, a gap between the raised portion for receiving the substrate provided on the receiving tool and the circular hole of each disc-shaped resin substrate is preferably not more than 5 μm (more preferably not more than 3 μm), and a gap between the hub-receiving center axis provided on the receiving tool and the clamping hole of each magnetizable hub is preferably not more than 8 μm (more preferably not more than 5 μm).

Thus, the joining of the magnetizable hub to the information recording disc can be carried out with high accuracy through simple operation of fitting the precisely prepared information recording disc to the precisely prepared raised portion for receiving the substrate and fitting the hub to the precisely adjusted hub-receiving center axis in order.

According to the invention, there are two methods for joining other magnetizable hub to other surface of the above-obtained information recording disc joined with one magnetizable hub on one surface. Each of those methods is described hereinafter referring to FIGS. 2 and 3, respectively.

Figure 2:
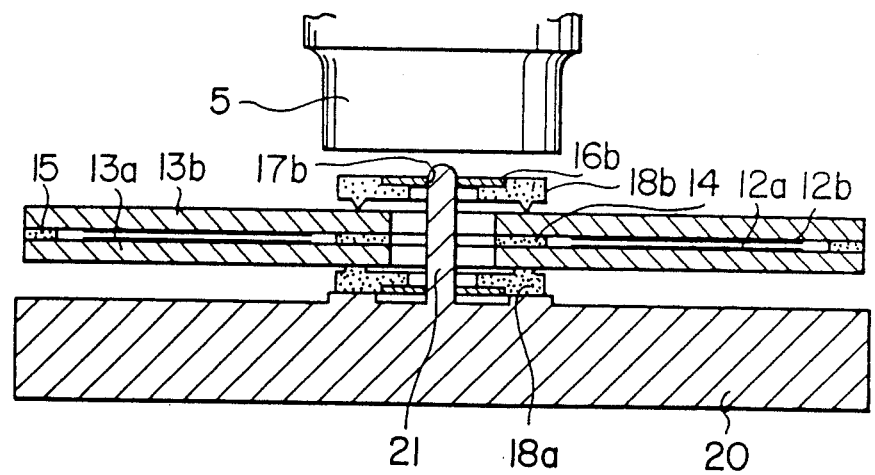

FIG. 2 illustrates a method in which the information recording disc having been joined with a magnetizable hub 18a on one surface is turned over and another magnetizable hub 18b is joined onto a resin substrate 13b (other surface) by means of ultrasonic welding.

In detail, in the method shown in FIG. 2, the information recording disc to which a magnetizable hub 18a has been joined is turned over, then the recording disc is fitted to a hub-receiving center axis 21 of a receiving tool 20 in such a manner that the center of the recording disc and the hub-receiving center axis are made concentric, and thereafter another magnetizable hub 18b (which may be in the same shape as that of the hub previously joined) having a clamping hole 17b is fitted to the hub-receiving center axis 21 of the receiving tool 20 in such a manner that the center of the clamping hole 17b and the hub-receiving center axis 21 are made coaxial. The receiving tool 20 may be the same type as that of the aforementioned receiving tool (including the same receiving tool), but generally a receiving tool equipped with a substrate-setting bed having different size and different shape from those of the aforementioned raised portion for receiving a substrate is employed.

The magnetizable hub 18b is welded to the resin substrate 13b in the same manner as described above, that is, the ultrasonic wave-applying horn 5 of the ultrasonic welding machine is descended to press the magnetizable hub 18b, and ultrasonic wave is applied to the substrate from the applying horn 5.

Figure 3:
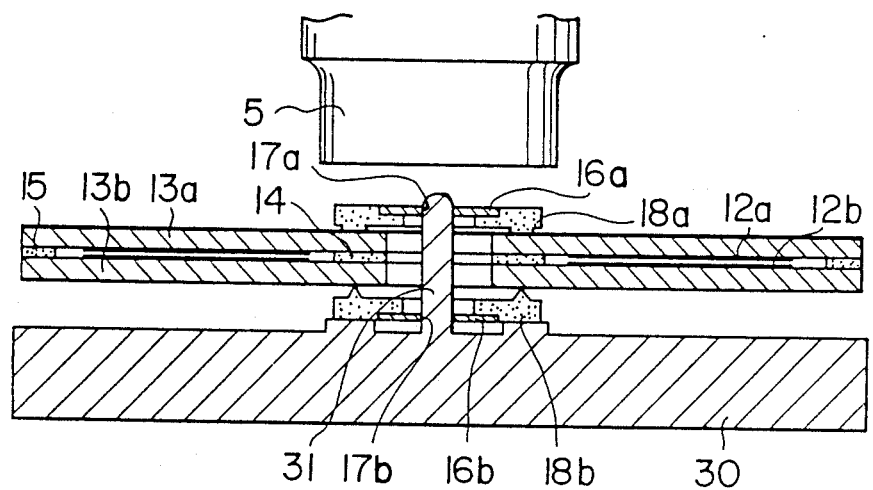

FIG. 3 illustrates a method in which another magnetizable hub 18b is joined to the resin substrate 13b where no magnetizable hub is provided by means of ultrasonic welding, without turning over the above-obtained information recording disc joined with the magnetizable hub 18a on one surface.

In detail, a receiving tool 30 equipped with a hub-receiving center axis 31 is first prepared, and then to the hub-receiving center axis 31 is fitted another magnetizable hub 18b having a magnetizable substance 16b and a clamping hole 17b in such a manner that the center of the magnetizable substance 16b is positioned downward and the clamping hole 17b and the hub-receiving center axis 31 are made coaxial. Thereafter, keeping the side of the magnetizable hub 18a upward, the optical disc obtained in the method shown in FIG. 1 is fitted to the hub-receiving center axis 31 of the receiving tool 30 in such a manner that the center of the clamping hole 17a and the hub-receiving center axis 31 are made coaxial.

The joining of the magnetizable hub 18b to the resin substrate 13b of the information recording disc is conducted by means of ultrasonic welding in the same manner as described above, that is, the ultrasonic wave-applying horn 5 of the ultrasonic welding machine is descended to press the magnetizable hub 18a, and ultrasonic wave is applied to the substrate from the applying horn 5.

In the latter process, each of the two steps, one for producing an optical disc joined with a magnetizable hub on one surface (i.e., step shown in FIG. 1) and the other for fitting other magnetizable hub to other receiving tool, is independent of each other and any one of them can be carried out prior to the other.

The receiving tool used in the step for producing the information recording disc joined with a magnetizable hub on one surface (step shown in FIG. 1) and the receiving tool used in the subsequent two steps for fitting another magnetizable hub to the other surface of the above-obtained recording disc are designed in the same manner except that the receiving tool used for fitting another hub onto the other surface of the disc is not provided with a raised portion for receiving a substrate and preferably provided with a relief for a magnetizable substance because the magnetizable substance of a magnetizable hub is positioned on the side of the receiving tool. That is, the receiving tool used in the latter two steps has the same diameter, the same central location of the hub-receiving center axis, etc. as those of the receiving tool used in the step shown in FIG. 1. Accordingly, a gap between the hub-receiving center axis of the receiving tool and the magnetizable hub is not more than 8 μm, preferably not more than 5 μm.

In the invention, the location of the two hubs is determined based on the circular hole provided on the disc-shaped resin substrate through a precisely prepared receiving tool. For this reason, the circular hole is provided at the center of the resin substrate with high accuracy (that is, in such a manner that the circular hole and the pregroove are made concentric) in the substrate-molding procedure. By arranging the information recording disc prepared from the above-prepared substrate on the precisely prepared receiving tool under the coaxial condition, the two magnetizable hubs can be joined to the recording disc with prominently small eccentricity.

In the present invention, accordingly, there is no need of conducting the conventional centering process comprising the steps of determining the center of the information recording disc on a rotatable X-Y table using a microscope, coinciding the center of the information recording disc with the center of a rotating shaft of the X-Y table and joining the recording disc to a hub which has been set coaxially with the center of the rotating shaft of the X-Y table. For joining the magnetizable hub to the information recording disc in the conventional process, particularly in the case of an information recording medium of air-sandwich type, the above-mentioned procedure for determining the center of an information recording disc using a microscope is required per each disc of the two discs, so that a long period of time is needed.

In the present invention, there is an advantage such that the time required for joining the hub to the information recording disc is prominently short, as well as other various advantages (mentioned below), although molding of substrates, combining of the substrates and preparation of receiving tool should be carried out more precisely than those conventionally conducted. Those drawbacks on the substrate-molding procedure or the preparation of the receiving tool are almost no problem in the invention. In detail, the time required for the joining is only 10–20 seconds in the invention, while the time therefor is 3–4 minutes in the convention one, in the case of using ultrasonic welding. Further, in the case of ultrasonic welding of the information recording disc and the magnetizable hub, the locational deviation hardly occur and hence accurate joining is possible, because the recording disc and the hub can be fixed by means of the center axis of the receiving tool. Moreover, since the magnetizable hub is provided with no boss for fitting into the circular hole of the disc, no control of the size of the flange is needed.

In addition, in the case of using the method shown in FIG. 3 in the latter step, it is unnecessary to turn over the information recording disc having been joined with a magnetizable hub on one surface obtained by the first step, so that the process of the invention is suitable for automatic production.

As for the joining of the magnetizable hub to the information recording disc, a method of ultrasonic welding is mentioned above, but other methods such as a method of heat welding or a method of adhesion can be also employed.

The optical disc may be a magnetic optical disc in which the recording layer is made of a magnetic layer. In this case, two resin substrates are not required to be constituted in the air-sandwich structure, and any inner-side ring-shaped spacer and outer-side ring-shaped spacer is not necessary. In joining of such magnetic optical disc to a magnetizable hub, the present invention can be also effectively employed.

Spacers, hubs, substrates and recording layers which are conventionally used can be also used in the process for producing an information recording medium according to the invention. These materials will be briefly described below.

There is no specific limitation on the materials for the spacer, and examples thereof include metals such as aluminum and synthetic resins which are conventionally employed for spacers.

There is no specific limitation on the materials for the magnetizable hub, provided that the material is favorably joined to the disc-shaped substrates. Examples of the materials for the magnetizable hub include thermoplastic resins such as polycarbonate resin or acetal resin. It is desirable that the same material as that of the disc-shaped substrate is used as the hub material in consideration of coefficients of thermal expansion and moisture absorption expansion.

The magnetizable body, an essential constituent of the magnetizable hub, is made of magnetizable substance such as iron or iron-containing alloy, and preferably is a substance as hardly producing rust. The form of the magnetizable body is not especially limited. Examples of its representative forms include magnetizable pieces such as those in the form of a stick, a sheet or a ring, and further in the form of a powder made by powdering the magnetizable substance. The magnetizable powder can be kneaded in the resin material of the hub to carry out injection molding.

Materials of the substrate employable in the invention can be optionally selected from those used for the known information recording media. As substrate materials, preferably employed are acrylic resins such as cell cast polymethyl methacrylate, injection-molded polymethyl methacrylate and polymethyl acrylate; vinyl chloride resins such as polyvinyl chloride and vinyl chloride copolymers; epoxy resins; amorphous polyolefins; and other synthetic resins such as polycarbonate, from the view-points of optical characteristics, surface smoothness, processability, handling properties, long-term stability and manufacturing cost. Polymethyl methacrylate, polycarbonates and epoxy resins are preferred from the view-points of dimensional stability, transparency and surface smoothness.

On the surface of the substrate where the recording layer is to be provided, an undercoating layer (and/or an intermediate layer) may be provided for the purpose of improving surface smoothness and adhesion between the substrate and the recording layer or preventing the recording layer from being denatured.

Examples of materials for the preparation of the recording layer include metals such as Te, Zn, In, Sn, Zr, Al, Ti, Cu, Ge, Au and Pt; semimetals such as Bi, As and Sb; semiconductors such as Si; and alloys or mixtures thereof. Also employable are compounds of these metals, semimetals and semiconductors such as sulfides, oxides, borides, silicates, carbides and nitrides, or mixtures of these compounds and metals. Otherwise, dyes or combinations of dyes and polymers, the above-mentioned metals or semimetals can be also employed as the recording layer material.

The recording layer may contain other metals, semimetals or compounds thereof than the above-mentioned ones which are conventionally used for known recording media.

The recording layer can be formed on the substrate directly or through an undercoat layer by means of metallizing, sputtering, ion plating or coating.

We claim:

1. A process for producing an information recording medium which comprises the steps of:
   fitting an information recording disc which has a circular hole at its center and comprises two disc-shaped resin substrates joined together, a pre-groove provided on each of the substrates and a recording layer for optically recording or reproducing information which is provided on at least one of the substrates, a respective recording layer being positioned inward, onto a first receiving tool provided with a disc-shaped raised portion for receiving a substrate at the center of the first receiving tool and a center axis for receiving a hub extended from the center of the raised portion in such a manner that the centers of the circular hole of the information recording disc and the raised portion of the receiving tool are made concentric, then fitting a magnetizable hub having a magnetizable substance and a clamping hole at its center to the information recording disc in such a manner that the center of the clamping hole and the center axis of the first receiving tool are made coaxial, and joining the magnetizable hub to the information recording disc; and turning over the information recording disc joined with the magnetizable hub to position upward a resin substrate-side of the information recording disc where the magnetizable hub is not joined, fitting the information recording disc onto a second receiving tool having a center axis for receiving a hub in such a manner that the center axis and the clamping hole of the magnetizable hub are made coaxial, then fitting another magnetizable hub having a clamping hole to the information recording disc in such a manner that the clamping hole and the center axis are made coaxial, and joining said another magnetizable hub to the information recording disc.

2. The process as claimed in claim 1, wherein the eccentricity between the circular hole of each of the disc-shaped resin substrates and the pregroove on the surface of the resin substrate is not more than 10 $\mu$m, and the eccentricity between both circular holes of the two disc-shaped resin substrates of the information recording disc joined together is not more than 5 $\mu$m.

3. The process as claimed in claim 1, wherein a gap between the periphery of the disc-shaped raised portion for receiving a substrate provided on the first receiving tool and the circular hole of each of the disc-shaped resin substrates is not more than 5 $\mu$m, and a gap between the center axis of each of the first and second receiving tools and the clamping hole of each of the magnetizable hubs is not more than 8 $\mu$m.

4. The process as claimed in claim 1, wherein the eccentricity of the periphery of the raised portion for receiving a substrate and the center axis for receiving a hub provided on the disc-shaped raised portion is not more than 2 $\mu$m.

5. A process for producing an information recording medium which comprises the steps of:

fitting an information recording disc which has a circular hole at its center and comprises two disc-shaped resin substrates joined together, a pregroove provided on each of the substrates and a recording layer for optically recording or reproducing information which is provided on at least one of the substrates, a respective recording layer being positioned inward, onto a first receiving tool provided with a disc-shaped raised portion for receiving a substrate at the center of the first receiving tool and a center axis for receiving a hub extended from the center of the raised portion in such a manner that the centers of the circular hole of the information recording disc and the raised portion of the first receiving tool are made concentric, then fitting a magnetizable hub having a magnetizable substance and a clamping hole at its center to the information recording disc in such a manner that the center of the clamping hole and the center axis of the first receiving tool are made coaxial, and joining the magnetizable hub to the information recording disc;

fitting another magnetizable hub having a clamping hole onto a second receiving tool provided with a center axis for receiving a hub in such a manner that the center of the clamping hole and the center axis are made coaxial; and fitting the information recording disc joined with the magnetizable hub, said magnetizable hub being positioned upward, onto the magnetizable hub on the second receiving tool in such a manner that the clamping hole of the magnetizable hub having been jointed to the information recording disc and the center axis of the second receiving tool are made coaxial, and joining said another magnetizable hub on the second receiving tool to the information recording disc.

6. The process as claimed in claim 5, wherein the eccentricity between the circular hole of each of the disc-shaped resin substrates and the pregroove on the surface of the resin substrate is not more than 10 $\mu$m, and the eccentricity between both circular holes of the two disc-shaped resin substrates of the information recording disc joined together is not more than 5 $\mu$m.

7. The process as claimed in claim 5, wherein a gap between the periphery of the disc shaped raised portion for receiving a substrate provided on the first receiving tool and the circular hole of each of the disc-shaped resin substrates is not more than 5 $\mu$m, and a gap between the center axis of each of the first and second receiving tools and the clamping hole of each of the magnetizable hubs is not more than 8 $\mu$m.

8. The process as claimed in claim 5, wherein the eccentricity of the periphery of the raised portion for receiving a substrate and the center axis for receiving a hub provided on the disc-shaped raised portion is not more than 2 $\mu$m.

* * * * *